United States Patent [19]
Kraus

[11] Patent Number: 5,224,624
[45] Date of Patent: Jul. 6, 1993

[54] PLASTIC LOCKING COVER AND PROCESS FOR ATTACHING SAME IN A SUPPORT APERTURE

[75] Inventor: Willibald Kraus, Grunstadt, Fed. Rep. of Germany

[73] Assignee: TRW United Carr GmbH & Co., Enkenbach-Alsenborn, Fed. Rep. of Germany

[21] Appl. No.: 712,193

[22] Filed: Jun. 7, 1991

[30] Foreign Application Priority Data

Jun. 8, 1990 [DE] Fed. Rep. of Germany ....... 4018425

[51] Int. Cl.$^5$ .............................................. B65D 55/00
[52] U.S. Cl. .................................... 220/201; 220/307; 215/358; 215/364
[58] Field of Search ........................ 220/201, 307, 305; 215/358, 364

[56] References Cited

U.S. PATENT DOCUMENTS

| | | | |
|---|---|---|---|
| 2,529,644 | 11/1950 | Webber | 220/201 |
| 3,414,158 | 12/1968 | Hunckler et al. | 220/201 |
| 4,126,758 | 11/1978 | Krumme | 220/201 X |

Primary Examiner—Gary E. Elkins
Assistant Examiner—Paul A. Schwarz
Attorney, Agent, or Firm—Fay, Sharpe, Beall, Fagan, Minnich & McKee

[57] ABSTRACT

The specification and drawings disclose a plastic sealing or locking cover 1, and a process for using it to seal an aperture of a support 3, such as an opening in an automobile body component. At least one cavity 5 of the locking cover 1 is filled with a medium 6 which can expand under the influence of temperature after mounting of the locking cover 1 in the support aperture 2 to thus press areas of the locking cover against neighboring areas of the support aperture to create a tight seal.

12 Claims, 2 Drawing Sheets

PLASTIC LOCKING COVER AND PROCESS FOR ATTACHING SAME IN A SUPPORT APERTURE

BACKGROUND OF THE INVENTION

The invention relates to a plastic locking cover and a process for mounting the same in an aperture of a support. The invention is especially suited for use as a body hole plug for automobile bodies and various design possibilities exist for such a locking cover.

State of the art locking covers are already known which are made of plastic and which have at their top and bottom surfaces a sealing lip which act and sealingly engage upon the neighboring surface planes in the area of the associated support aperture. (See, for example, German Patent Nos. 35 12 582 and 30 11 448 and British Patent No. 1,354,973). With all such known locking covers, there exists, however, the drawback of their unintentional detachment from the support aperture. Consequently, provisions must always be made, such as through additional attachment devices, to assure the respective locking cover is permanently mounted within the support aperture.

By contrast, the objective of the present invention is based upon development and appropriate design of a locking cover, so that an operationally safe, permanent mounting in a support aperture, for example an opening in automobile body component, is guaranteed without use of additional attachment devices.

SUMMARY OF THE INVENTION

According to the invention, this task is solved by providing at least one cavity in the locking cover which cavity is filled with a medium that can significantly expand under the influence of temperature. After mounting the locking cover in the support aperture, the medium can be heated to expand and thus press areas of the locking cover against neighboring areas of the support aperture. This results in the advantage that the locking cover, consisting of two materials, is attached within a support aperture; the medium within the cavity of the locking cover expands under the influence of temperature, whereby in mounted state, the respective areas of the locking cover press themselves against the inner edge of the support or collar hole, and thus absolute sealing is guaranteed. It does not matter whether the respective support apertures are designed round, oval or angular.

Into the cavity of the locking cover a known substance, which significantly expands under the influence of temperature is injected, for instance by the known two-component injection molding process. The substance preferably can, according to another characteristic of the invention, expand within a temperature range of, for instance, up to approximately 200° C. This results in simple mounting, whereby through temperature actuated swelling of the respective material positioned in the cavity, the corresponding area of the locking cover is pressed so firmly against the interior wall of the support aperture that tight seating, water-tightness and, possibly, impermeability to gas is guaranteed.

In a further more limited aspect of the invention, the cavity in which the expanding substance is contained can be arranged symmetrically in the locking cover. The cavity may either extend through the entire locking cover or be designed in the locking cover in the shape of a ring adjacent the cover's edge.

According to another possible aspect of the invention, the cavity can be joined via at least one aperture with the top surface side and/or the bottom surface side, so that the material which swells under expansion of heat, can be easily positioned in the cavity.

Another refinement of the invention is in the possibility that the locking cover can be designed as a single piece or in two pieces. The two pieces of the locking cover can be bonded together with one another permanently, for instance through an adhesion process, to close the corresponding cavity securely.

BRIEF DESCRIPTION OF THE DRAWINGS

The above and other features of the invention will become apparent from the following description when read in conjunction with the accompanying drawings wherein.

DETAILED DESCRIPTION OF THE PREFERRED EMBODIMENT

Figure 1A:
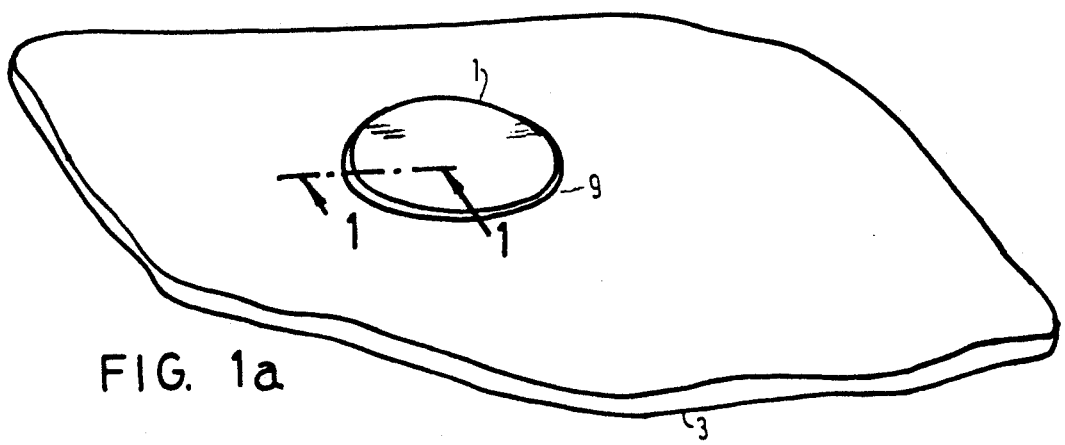
FIG. 1A is a pictorial view of a vehicle body member having an aperture with a hole plug or cover member formed in accordance with a preferred embodiment of the invention installed therein.

As can be best understood from FIG. 1A, the purpose of the locking cover is for installation in an aperture 2 of a support member 3, for example, a structural or panel member of an automobile body. In the arrangement of FIG. 1A, the locking cover includes a radially facing circumferential ring area 7 arranged to act upon the inwardly facing neighboring area 8 of the support aperture 2. The arrangement produces interengagement in such manner that secure attachment of locking cover 1 in support aperture 2 is guaranteed, that is to say it can be water tight and even impermeable to gas. To that end, the locking cover 1 exhibits in its interior an internal cavity 5 which is adjacent the filled with a medium, for instance a plastic substance 6 capable of undergoing substantial expansion. The cavity 5 of locking cover 1 is produced through a conventional injection molding process, for instance gas pressure process. Accordingly, the appropriate plastic material 6 can be filled into the cavity 5 by means of known injection procedures.

The material 6 filling chamber 5 is selected so as to be capable of undergoing significant selective expansion and remaining in the expanded state after once being expanded. Thus, after the cover has been installed, selective expansion of material 5 produces tight sealing and locking engagement between the exterior periphery of the cover and edge of the aperture.

Although it is believed that many different materials could be used to form covers in accordance with the invention, a specific material combination is the use of a thermoplastic for the main body of the cover and a plastic such as polyvinylchloride, polypropylene, or polyurethane having a charging gas mixed therein used as the filling for chamber 5. A typical charging gas would be nitrogen.

When a cover formed as described above is installed and then heated to a temperature up to about 200° C., the plastic softens and the charging gas expands thus expanding the softened plastic and forcing it radially into sealing and locking engagement with the edge of the aperture.

After installation of the locking cover 1 containing the material 6 in cavity 5, the entire unit is subjected to heat treatment, by being heated to a temperature range where the material 6 expands, for example, from +90° C. to ≦180° C. Thus, the locking cover 1 is caused to be seated securely in support aperture 2 through swelling of material 6. In this arrangement, locking cover 1 exhibits, respectively, in the upper and lower area, sealing lips 9 and 10, which extend circumferentially about the cover and which position themselves, after completion of the heat treatment, against neighboring areas of the support aperture. By proper design of the lips 9 and 10 relative to the cavity 5, it is possible to have the lips rotate or shift into more firm engagement with the areas surrounding the aperture.

In the embodiment according to FIG. 2, the locking cover 1 is designed identically to that described with reference to FIGS. 1A and 1; its purpose, however, is for the sealing and locking of a support aperture 2 of the type which is equipped with a circumferential collar 4. Thus, the cover can be used with different apertures with equal facility.

Figure 3:
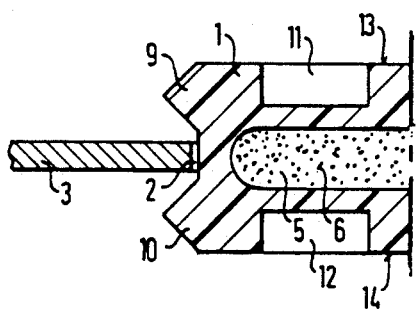

In the embodiment according to FIG. 3, the locking cover 1 is designed differently in that on the upper side 13 and the bottom side 14, there is present a somewhat ring-shaped recess 11, 12, respectively, Again, a cavity 5 is employed which is filled with the plastic material 6, which expands under the influence of temperature and remains in the expanded condition after being heated above a predetermined temperature.

Figure 2:
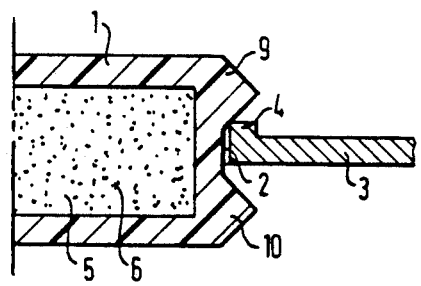
FIGS. 2-10 are views similar to FIG. 1 but showing modified body member apertures and/or cover members.
Figure 4:
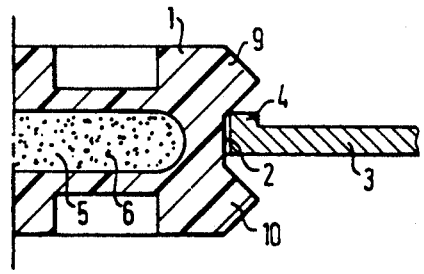

In the embodiment according to FIG. 4, once again, like FIG. 2, there exists the possibility of sealing aperture 2 of the support 3, which is equipped with a circumferential collar 4.

Figure 5:
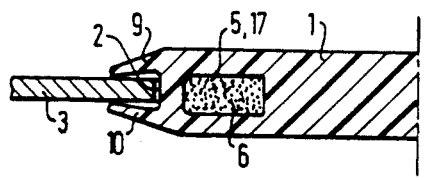

While in the embodiments according to FIGS. 1 to 4, the cavity 5 extends across the entire locking cover 1, the cavity in the embodiment according to FIG. 5 is designed as ring 17 and is also filled with the previously discussed plastic material 6.

Figure 6:
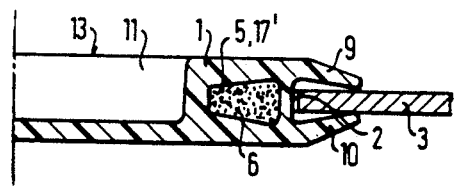

In such an arrangement, there exists the possibility according to the FIG. 6 embodiment to provide, on the upper side 13 of locking cover 1, a cup-shaped recess 11. Moreover, the ring-shaped cavity 5, 17', respectively can have any selected geometric shape.

Figure 1:
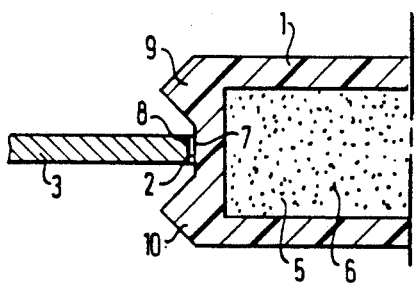
FIG. 1 is a partial cross-sectional view taken on line 1—1 of FIG. 1A.

Again, the locking cover 1 according to FIG. 1 and FIG. 6 has circumferential sealing lips 9 and 10 in the upper and lower area. These lips can have other shapes and can be either rigid or flexible depending upon the environment in which they are to be used.

Figure 7:
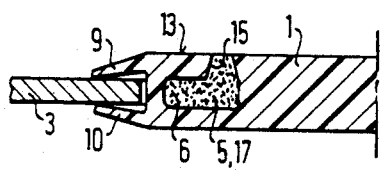

In the embodiment according to FIG. 7, the cavity 5 is connected via at least one opening 15 with the upper side 13 of locking cover 1. Thus, material 6 can be easily installed via opening 15 into the ring-shaped 17 cavity 5 of locking cover 1.

Figure 8:
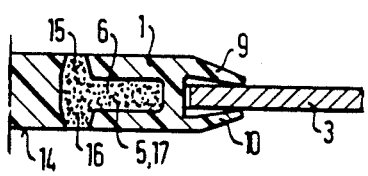

According to FIG. 8, the possibility also exists that at least one aperture, 15, 16, respectively, leads from the upper side 13 and lower side 14, respectively, to the cavity 5, which is designed in the shape of a ring. In such an arrangement as well, the corresponding plastic material 6 can be placed in simple fashion into the cavity 5. However, the material 6 must be of such consistency that there can be no undesired slipping of the plastic material out of the locking cover 1.

All the aforementioned designs of locking cover 1 have in common that they are each designed in one piece and exhibit in the interior a randomly shaped cavity 5.

Figure 9:
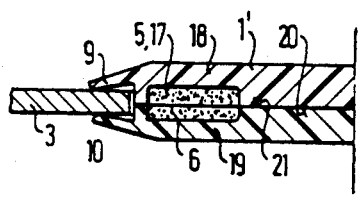

According to the embodiment of FIGS. 9 and 10, the locking cover 1' can be designed in two pieces with a cavity 5 built into either or both of the two parts is, 19 which are subsequently joined permanently together. These two pieces 18 and 19 are joined at the adjacent areas 20, 21, for instance through gluing or bonding, and after such joining, they form a one-piece locking cover 1'. Again, the appropriate material 6 can be placed into the rectangularly designed cavity 5, according to FIG. 9.

The possibility also exists to form the two half-dish pieces 18, 19 so that they are connected by means of a hinge-joint and to fold them together, for instance, for gluing.

Figure 10:
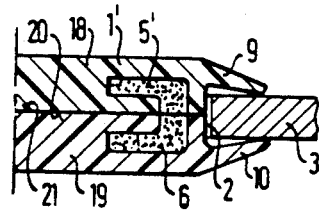

In the embodiment according to FIG. 10, the cavity 5' is designed to have a "U"-shaped cross-section. It should be appreciated that the cavity 5 could have other cross-sectional shapes. Likewise, the two pieces 18, 19 of the locking cover can again have circumferential sealing lips 9, 10, respectively.

The two-piece locking cover 1' can also be divided, in an embodiment which is not specifically illustrated in the drawings, in the area of its longitudinal axis into two semi-circular pieces. The pieces are, for example, connected with each other by means of a hinge joint. The pieces can be folded together to form one unit containing the cavity with adjacent areas glued together.

As a result of the specific design of locking cover 1, 1', respectively, containing a material 6 placed into cavity 5, 5', respectively, which expands under the influence of temperature, for instance up to 200° C. and above, operationally secure attachment of the locking cover in a support aperture is guaranteed in simple fashion. Moreover, firm seating and water tightness results. Under certain circumstances, even impermeability to gas can be attained.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A locking cover for sealing an aperture in a support member comprising a molded plastic body sized to generally fit the aperture and having areas for pressing against adjacent areas of the aperture, said locking cover further including at least one internal cavity (5, 5') filled with a substance (6) which is capable of expanding significantly and remaining permanently in said expanded condition when heated above a predetermined temperature such that after being mounted in the aperture, the cover can be heated above the predetermine temperature to expand said substance wherein said substance presses said areas (7) of the locking cover (1, 1') against the adjacent areas (8) of the support aperture (2).

2. A locking cover according to claim 1 wherein the material (6) is a plastic substance, which remains in expanded condition when heated to a temperature range of up to approximately 200° C.

3. A locking cover according to claim 1 wherein the cavity (5, 5') is arranged symmetrically in the molded plastic body.

4. A locking cover according to claim 3 wherein the cavity (5, 5') extends within the entire molded plastic body.

5. A locking cover according to claim 3 wherein the cavity (5, 5') in the molded plastic body is designed as ring (17, 17').

6. A locking cover according to claim 4 wherein the locking cover (1, 1') includes a side having a recess (11).

7. A locking cover according to claim 4 wherein the locking cover (1, 1') includes opposing sides, each of which includes a recess (11, 12).

8. A locking cover according to claim 1 wherein the cavity (5) is connected via at least one aperture (15, 16) with an exterior of the body.

9. A locking cover according to claim 1 wherein the body is unitary.

10. A locking cover according to claim 3 wherein the body is formed from two permanently joined pieces with the cavity (5') being located adjacent to areas of said two pieces (20, 21) which are permanently joined.

11. A locking cover according to claim 1 wherein the body is formed from two parts (18, 19) and the cavity is shaped like a "U" in cross-section.

12. A locking cover according to claim 1 wherein the body has at least one circumferential sealing lip (9, 10) which is sized to engage about the aperture.

* * * * *